T. F. McGANN.

SHADE-SUPPORTS.

No. 7,128. Reissued May 23, 1876.

Witnesses.
A. E. Denison.
J. W. Spiner

Inventor:
T. F. McGann.
by Cadwallader Wright & Brown
his Attys.

N. PETERS, PHOTO-LITHOGRAPHER, WASHINGTON, D. C.

UNITED STATES PATENT OFFICE.

THOMAS F. McGANN, OF BOSTON, MASSACHUSETTS.

IMPROVEMENT IN SHADE-SUPPORTS.

Specification forming part of Letters Patent No. 168,761, dated October 11, 1875; reissue No. 7,128, dated May 23, 1876; application filed April 5, 1876.

*To all whom it may concern:*

Be it known that I, THOMAS F. McGANN, of Boston, in the county of Suffolk and State of Massachusetts, have invented a new and useful Improvement in Globe-Holders; and I do hereby declare that the following is a full, clear, and exact description of the same, reference being had to the accompanying drawing, forming a part of this specification, in which—

Figure 1:
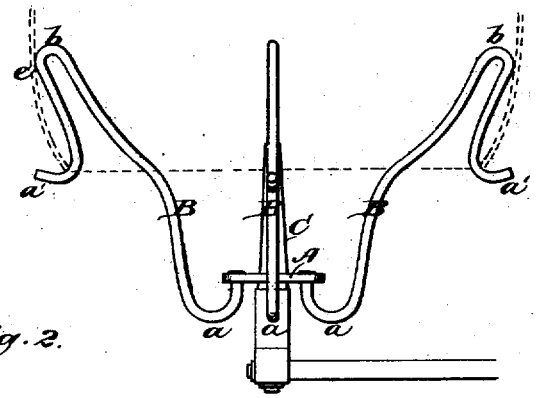
Figure 2:
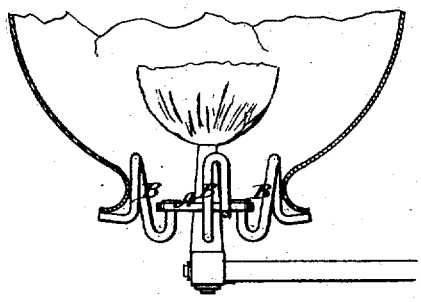
Figure 3:
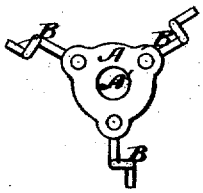
Figure 4:
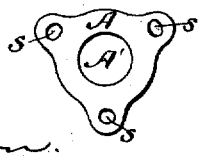
Figure 5:
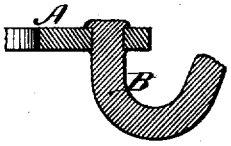

Figure 1 represents a side view of a globe-holder constructed in accordance with my invention. Figs. 2 and 3 represent side and top views of a modification of the same. Fig. 4 represents a top view of the socketed supporting-plate before the wire arms are inserted; and Fig. 5 represents a sectional view, showing one of the arms inserted in its socket.

Similar letters of reference in the drawing refer to like parts.

This invention relates to that class of globe-holders for gas-burners which are composed of elastic arms riveted to a supporting-plate, and curved at their outer ends in such manner as to grasp the lower edge or flange of a globe or shade, and hold the latter over the supporting-plate, the plate being adapted to inclose and be supported on the tube of a gas-burner. Heretofore these arms have been made of strips of metal, usually flat or elongated in cross-section, and attached to the supporting-plate by separate rivets, which pass through the material of the arms and the supporting-plate, the arms having to be punched to receive the rivets, and being thus weakened.

My invention has for its object to improve the construction of this class of holders in such manner as to produce a holder which shall be at once cheaper, stronger, and more efficient than those heretofore made. To this end my invention consists in a holder constructed as follows, viz: The supporting-plate is provided with sockets or perforations for the arms, and the arms are composed of lengths of elastic wire, the ends of which are inserted into and through the sockets, and headed or upset, the result being the rigid connection of the arms to the supporting-plate, the ends of the arms constituting rivets, all of which I will now proceed to describe.

In the drawings, A represents the supporting-plate, which is provided with a central opening, A′, adapted to receive and be supported on the tube C of a gas-burner, as shown in Fig. 1. The plate A is preferably made of hard rolled plate metal, of suitable thickness, and is provided with orifices or sockets *s*, which extend through the plate, and are preferably made at equal distances from each other and from the central opening A′. These sockets are preferably oval or irregular in shape, as shown in Fig. 4. B B B represent the elastic arms, which are composed of lengths of wire bent into the desired form. The lower ends of the arms B are inserted into the sockets *s* of the supporting-plate, and project sufficiently through the latter to be upset or headed, as shown in Fig. 5, these ends constituting rivets. The wire composing the arms B is of such size as to fit very tightly in the sockets and completely fill the same, the metal of the arms being preferably softer than that of the plate, and crowded so closely into the sockets as to become rigidly connected to the plate, and thus be prevented from turning or rotating independently, while the upsetting or heading of the ends of the arms renders it practically impossible for them to be withdrawn from the plate.

I prefer, in connecting the arms to the plate, to hold each of the arms rigidly in a suitable clamp or vise, which gripes the arm near its end, and forces one of the sockets of the plate over the end of the arm, until the latter projects through the plate, this operation forming a slight shoulder or burr on the wire against one side of the plate. Then, with a suitable swage, I upset or flatten out the projecting end of the arm upon the opposite surface of the plate. The arms are thus expeditiously and strongly connected to the plate, becoming, in effect, integral parts of the plate, inasmuch as they cannot be turned without twisting the metal.

The arms B project in such direction from the plate A, and are so formed at their outer ends, as to support a globe in its proper position with relation to the gas-flame, and by their elasticity to prevent the globe from falling or being displaced under ordinary usage. The arms B are adjusted in such manner that their outer ends shall be displaced or sprung from their normal position by the operation of applying them to the globe, while their elasticity or constant effort to regain their normal position causes them to bear with a yielding pressure against the globe, the pressure exerted by each arm being in a different direction from that exerted by the others. The plate A constitutes a fulcrum or rigid support for the arms; consequently, either arm may be bent or sprung from its normal position without affecting the position of the other arms. In the present case I adapt the arms B to hold the shade by bearing outwardly against its interior, at or near its lower edge or neck, as shown in the drawings, the arms being bent downwardly from their point of attachment to the plate A, forming a loop, *a*, then upwardly and outwardly to the point *b*, and finally downwardly and outwardly to the point *a'*, the arms bearing against the inner surface of the shade at *b*, while the lower edge of the shade bears upon the arms at *a'*.

In Fig. 1 I have shown the arms B as adapted to hold globes which have no flange, and in Figs. 2 and 3 I have shown a modification adapted to hold flanged globes.

By this construction a globe-holder is produced which is simple and cheap in its construction and effective in its operation.

If desired, the sockets *s* of the plate A may be round instead of elongated, as the elongated form is not indispensable, and any irregularity or corrugation of the margins of the sockets would answer the purpose.

I am aware that globe-holders have been made by folding continuous strips of wire to form both the arms and supporting-socket, and I do not claim, broadly, a holder having wire arms.

I claim as my invention—

As a new article of manufacture, a globe-holder composed of a punched or socketed plate, A, and elastic wire arms B, connected thereto, substantially as described.

In testimony whereof I have hereto signed my name this 28th day of March, A. D. 1876.

THOMAS F. McGANN.

Witnesses:
A. E. DENISON,
SAML. M. BARTON.